O. SEELY.
Churn.
No. 45,182. Patented Nov. 22, 1864.
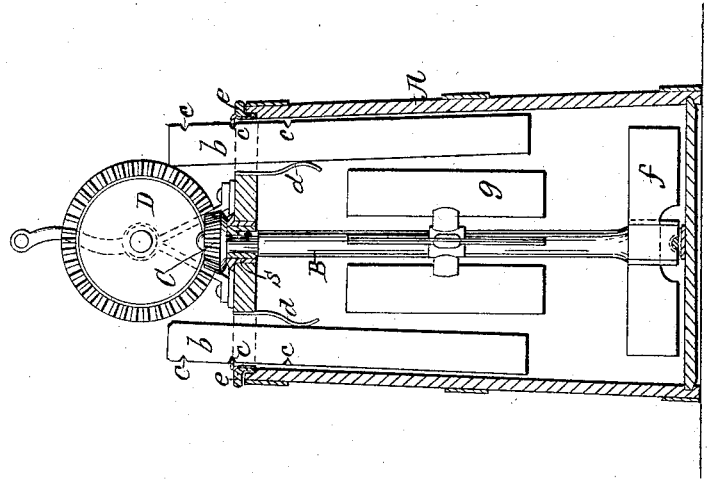
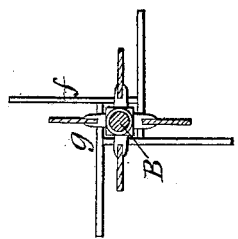
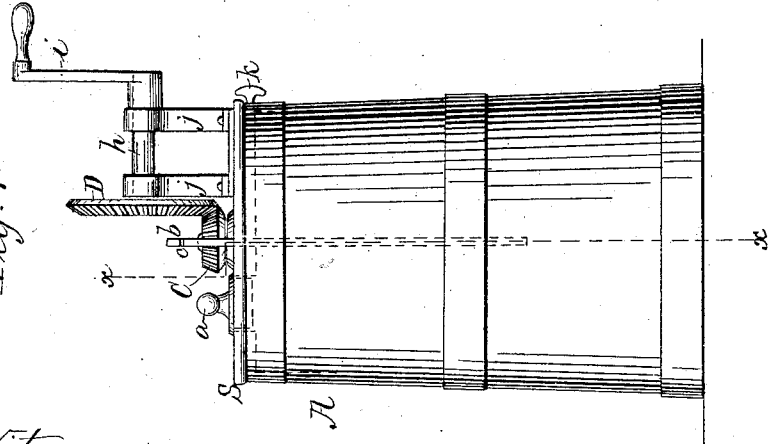
Witnesses
C. L. Topliff.
Henry Morris.
Inventor
O. Seely
per Munn & Co.
Atty's.

UNITED STATES PATENT OFFICE.

OBADIAH SEELY, OF SYRACUSE, NEW YORK.

IMPROVEMENT IN CHURNS.

Specification forming part of Letters Patent No. 45,182, dated November 22, 1864.

*To all whom it may concern:*

Be it known that I, OBADIAH SEELY, of Syracuse, in the county of Onondaga and State of New York, have invented new and useful Improvements in Churns; and I do hereby declare that the following is a full, clear, and exact description thereof, which will enable others skilled in the art to make and use the same, reference being had to the accompanying drawings, forming a part of this specification, in which—

Figure 1 is an elevation of my improved churn. Fig. 2 is an elevation of a vertical section taken on the line $x$ of Fig. 1. Fig. 3 is a plan view of the beaters $f$ and $g$ in position on their shaft B.

Similar letters of reference indicate like parts.

A represents the churn, whose shaft B is vertical and is stepped upon the bottom of the churn, and is driven by means of beveled geared wheels C and D, the latter of which is rigidly secured on the inner end of a shaft, $h$, that is supported in bearings provided in standards $j\,j$, rising from the cover S of the churn. The outer end of the shaft has a crank, $i$, by which it is rotated. The cover has a man-hole, $a$, on the side opposite to the standards.

The shaft B is provided with beaters or dashers $f$ near its lower end, (four in number,) whose extremities reach nearly to the sides of the churn, and also with beaters $g$, placed near the middle of its height. The latter are long in the direction of the axis of the shaft, but short in the direction of its radius, so as to accomplish their revolution without coming in contact with adjustable partitions $b\,b$, (two in number,) which are suspended from the cover S through radial slots, in which they are capable of moving up and down, so as to extend downward into the churn a greater or a less distance. A metallic blade or detent, $e$, is fixed to the cover at the outer end of each slot, so as to take into notches $c$, cut at various heights on the outer edges of the partitions, and the latter are held up to the detents and against the sides of the churn by means of flat springs $d$, fixed to the inner end of the slots and extending downward into the churn, along the inner edges of the partitions.

The cover S is secured upon the churn by means of a set or binding screw, K.

The action of the churn is as follows: The partitions $b$ are to be adjusted to suit the height of the milk or cream to be churned, when, on rotating the shaft, the lower dashers, $f$, will cause the milk to flow in a circuitous course around the sides of the churn, gradually ascending its sides by reason of centrifugal action until it comes in contact with the partitions, which interrupt its circuit and turn it aside against the revolving dashers $g$, which beat it back against the sides of the churn and the partitions.

Having thus described my invention, I claim as new and desire to secure by Letters Patent—

1. The combination of the vertical adjustable partitions with the lower revolving dashers, $f$, and the upper revolving dashers, $g$, substantially as and for the purposes above described.

2. The vertical adjustable partitions $b$, suspended within a churn through its cover and held against the sides of the churn, substantially as described.

OBADIAH SEELY.

Witnesses:
  J. HUNT,
  E. A. HUDSON.